United States Patent [19]

Ravichandran et al.

[11] Patent Number: 4,983,770
[45] Date of Patent: Jan. 8, 1991

[54] SUBSTITUTED HYDROXYLAMINE ESTER STABILIZERS

[75] Inventors: Ramanathan Ravichandran, Yonkers, N.Y.; Stephen D. Pastor, Basel, Switzerland

[73] Assignee: Ciba-Geigy Corporation, New York, N.Y.

[21] Appl. No.: 420,192

[22] Filed: Oct. 12, 1989

Related U.S. Application Data

[62] Division of Ser. No. 114,992, Oct. 26, 1987, Pat. No. 4,888,444.

[51] Int. Cl.$^5$ .......................................... C07C 291/00
[52] U.S. Cl. .................................. 564/300; 544/158; 544/383; 546/238; 546/239; 548/375; 548/542; 558/248
[58] Field of Search ............... 544/158, 383; 546/238, 546/239; 548/375, 542; 558/248; 564/300

[56] References Cited

U.S. PATENT DOCUMENTS 4,612,393  9/1986  Ravichandran et al. ........... 564/300

Primary Examiner—Richard L. Raymond
Attorney, Agent, or Firm—Harry Falber

[57] ABSTRACT

Substituted hydroxylamine ester stabilizers corresponding to the formula

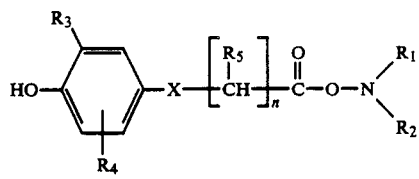

wherein n is 0–2, X is a direct bond, —S— or —CH$_2$S—, $R_1$ and $R_2$ are independently hydrogen, alkyl, cycloalkyl, aralkyl, $R_3$ and $R_4$ are independently alkyl, cycloalkyl or aralkyl, and $R_5$ is hydrogen or the group

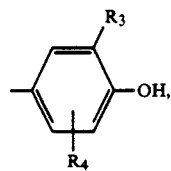

are effective in stabilizing organic materials against oxidative, thermal and actinic degradation.

9 Claims, No Drawings

SUBSTITUTED HYDROXYLAMINE ESTER STABILIZERS

This is a divisional of application Ser. No. 114,992 filed on Oct. 26, 1987, now U.S. Pat. No. 4,888,444.

Organic polymeric materials such as plastics and resins are subject to thermal, oxidative and photodegradation. A great variety of stabilizers are known in the art for stabilizing a diversity of substrates. Their effectiveness varies depending upon the causes of degradation and the substrate stabilized. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reactions which yield new chromophores or color bodies in the substrate or stabilizer. Problems of process stability and incompatibility must also be considered.

Various organic hydroxylamine compounds are generally known and some are commercially available. A number of patents disclose nitrogen-substituted hydroxylamines as antioxidant stabilizers for various substrates including polyolefins, polyesters and polyurethanes. U.S. Pat. Nos. 3,432,578, 3,644,278, 3,778,464, 3,408,422, 3,926,909, 4,316,996 and 4,386,224 are representative of such patents which basically disclose N,N-dialkyl-, N,N-diaryl and N,N-diaralkyl hydroxylamine compounds and their color improvement and color stabilizing activity.

In addition, various O-acylated hydroxylamine derivatives have been disclosed. For example, U.S. Pat. Nos. 3,184,500 and 3,344,190 disclose compounds of the formula $R_2NOCH_2CH_2OAcyl$, these compounds being noted for their pharmacological utility. U.S. Pat. No. 3,869,278 discloses compounds of the formula $R_1R_2NOR_3$ wherein $R_3$ is alkylcarbonyl, these compounds being noted as fruit abscission agents.

Furthermore, U.S. Pat. No. 4,666,962 discloses substituted aminoxy propionates as stabilizers for various organic materials U.S. Pat. No. 4,613,357 discloses N,N-disubstituted hydroxylamine esters of substituted pyridyloxyphenoxypropanoic acids and herbicidal methods of use.

Y. A. Beltagy et. al., Pharmazie 33, 711 (1978) describe the preparation of esters of $N^1$-methyl-$N^4$-hydroxypiperazine and N,N-dibenzylhydroxylamine with potential local anesthetic activity. Oae et al, Bull. Chem. Soc. Jpn., 49, 730–36 (1976) describe the synthesis and reactions of O-aroyl-N,N-di-(p-substituted-benzyl)hydroxylamine with various nucleophiles in dipolar aprotic solvents. Berkett et al. Tet., 29, 4189 [1973] and B. Ganem et al, Synthesis, 7, 537 (1983) describe the acylated dibenzylhydroxylamines as precursors to the dibenzylhydroxylamines. Torssell et al., Acta. Chem. Scand., B, 32, 118–24 (1978) describe O-benzoyl dialkylhydroxylamines. Mohrle et al., describe various acetylated dinaphthylhydroxylamines in Chem. Ber., 109, 1106–12 (1976). Horner et al. Ann., 606, 47–55 (1957) describe the preparation of EtN(OAc)Ph. O-Benzoyl-N-($\beta$-naphthyl)hydroxylamine and its use as an antioxidant in rubber is described in U.S.S.R. No. 115,827 (CA 53, 15034d).

It has now been determined that the compositions of this invention exhibit a variety of desirable properties stemming from the presence therein of the indicated substituted hydroxylamine esters. Thus, the compounds serve to protect various substrates such as polyolefins, elastomers and lubricating oils against the adverse effects of oxidative and thermal degradation. They are most effective as color improvers and process stabilizers in polyolefin compositions which may contain metal salts of fatty acids and which also contain a phenolic antioxidant.

It is the primary object of this invention to provide a class of hydroxylamine ester derivatives which exhibits a broad range of improved stabilization performance characteristics.

It is a further object to provide compositions of organic materials stabilized against oxidative, thermal and actinic degradation by the presence therein of said class of derivatives.

Various other objects and advantages of this invention will become evident from the following description thereof.

The stabilizing compounds of this invention correspond to the formula

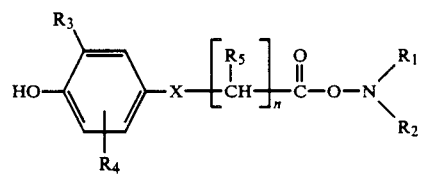

wherein n is 0–2;

X is a direct bond, —S— or —$CH_2S$—;

$R_1$ and $R_2$ independently are hydrogen, alkyl of 1 to 36 carbon atoms, cycloalkyl of 5 to 12 carbon atoms, allyl, aryl, aralkyl of 7 to 9 carbon atoms, said aralkyl substituted by alkyl of 1 to 36 carbon atoms, or $R_1$ and $R_2$ together with the nitrogen atom can form a 5–7 membered heterocyclic ring;

$R_3$ and $R_4$ independently are alkyl of 1 to 18 carbon atoms, cycloalkyl of 5 to 6 carbon atoms, phenyl, alkaryl of 7 to 18 carbon atoms or aralkyl of 7 to 9 carbon atoms; and $R_5$ is hydrogen or the group

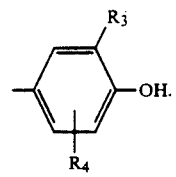

The $R_1$ and $R_2$ groups are preferably hydrogen or straight chain or branched alkyl with 1 to 18 carbon atoms such as methyl, ethyl, butyl, 2-ethylhexyl, octyl, decyl, dodecyl and octadecyl; cyclopentyl or cyclohexyl; or benzyl, alpha-methylbenzyl or alpha,alpha-dimethylbenzyl. $R_1$ and $R_2$ as benzyl or the alkyl mixture found in hydrogenated tallow amine are especially preferred.

A typical di(hydrogenated tallow)amine has the following distribution of alkyl substituents:

$T_1T_2NH$

| $T_1$ | $T_2$ | % |
|---|---|---|
| $C_{16}$ | $C_{14}$ | 1.9 |
| $C_{16}$ | $C_{16}$ | 12.4 |
| $C_{16}$ | $C_{17}$ | 2.8 |
| $C_{16}$ | $C_{18}$ | 36.0 |
| $C_{17}$ | $C_{18}$ | 3.9 |
| $C_{18}$ | $C_{18}$ | 39.0 |
| other | | 4.0 |

It is clear that the di(hydrogenated tallow)amine originating from animal sources may well vary somewhat in the specific distribution of alkyl substituents, but the di(hydrogenated tallow)amine contains major amounts of N,N-dihexadecylamine, N,N-dioctadecylamine and N-hexadecyl-N-octadecylamine. The individual components of the mixture can be separated by distillation under high vacuum.

Other applicable $R_1$ and $R_2$ groups include phenyl, naphthyl or heterocyclic members such as piperidyl, when combined with the nitrogen atom such as piperidino, substituted piperidyl, morpholino, pyrrolidinyl, pyrrolinyl, N-methylpiperazino, pyrazolidinyl and the like.

$R_3$ and $R_4$ are both preferably positioned ortho to the hydroxy group and represent $C_1$–$C_8$ alkyl and more preferably tert-$C_4$–$C_8$ alkyl such as tert-butyl, tert-amyl and tert-octyl. Alkaryl include tolyl, xylyl, and the like.

The derivatives of this invention can be prepared by reacting the appropriately substituted (hydroxyphenyl) benzoic, acetic or propanoic acid with a chloride such as oxalyl or thionyl chloride to prepare the corresponding acid chloride and then reacting the acid chloride with the appropriately substituted hydroxylamine in the presence of an acid acceptor such as triethylamine.

The starting materials needed to prepare the stabilizers of the invention are items of commerce or can be prepared by known methods.

The compounds of the present invention are particularly effective in stabilizing organic materials subject to oxidative, thermal and actinic degradation, such as plastics, polymers and resins.

Substrates in which these compounds are particularly useful are polyolefins such as polyethylene and polypropylene; polystyrene, including impact polystyrene, ABS resin, SBR, isoprene, as well as natural rubber, polyesters including polyethylene terephthalate and polybutylene terephthalate, including copolymers, and lubricating oils such as those derived from mineral oil.

In general polymers which can be stabilized include

1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under (1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under (5), for instance the copolymer mixtures known as ABS-, MBS-, ASA-or AES-polymers.

7. Halogen-containing polymers, such as polychloroprene, chlorinated rubbers, chlorinated or sulfochlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from $\alpha,\beta$-unsaturated acids and derivatives thereof, such as polyacrylates and polymethacrylates, polyacrylamide and polyacrylonitrile.

9. Copolymers from the monomers mentioned under (8) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane]terephthalate and polyhydroxybenzoates as well as block-copolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatin and derivatives thereof which are chemically modified in a polymer homologous manner, such as cellulose acetates, cellulose propionates and cellulose butyrates, or the cellulose ethers, such as methylcellulose.

27. Mixtures of polymers as mentioned above, for example PP/EPDM, Polyamide 6/EPDM or ABS, PVC/EVA, PVC/ABS, PVC/MBS, PC/ABS, PBTP/ABS.

28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, which materials may be used as plasticizers for polymers or as textile spinning oils, as well as aqueous emulsions of such materials.

29. Aqueous emulsions of natural or synthetic rubber, e.g. natural latex or latices of carboxylated styrene-/butadiene copolymers.

In general, the compounds of the present invention are employed in from about 0.01 to about 5% by weight of the stabilized composition, although this will vary with the particular substrate and application. An advantageous range is from about 0.05 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. Antioxidants 1.1. Alkylated monophenols, for example,
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-($\alpha$-methylcyclohexyl)-4,6-dimethylphenol
2,6-di-octadecyl-4-methylphenol
2,4,6-tri-cyclohexylphenol
2,6-di-tert.butyl-4-methoxymethylphenol 1.2. Alkylated hydroquinones, for example,
2,6-di-tert.butyl-4-methoxyphenol
2,5-di-tert.butyl-hydroquinone
2,5-di-tert.amyl-hydroquinone
2,6-diphenyl-4-octadecyloxyphenol 1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)

1.4. Alkylidene-bisphenols, for example,
2,2'-methylene-bis-(6-tert.butyl-4-methylphenol)
2,2'-methylene-bis-(6-tert.butyl-4-ethylphenol)
2,2'-methylene-bis-[4-methyl-6-($\alpha$-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-($\alpha$-methylbenzyl)-4-nonylphenol]
2,2'-methylene-bis-[6-($\alpha,\alpha$-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.butyl-4-methylphenyl]-terephthalate.

1.5. Benzyl compounds, for example,
1,3,5-tri-(3,5-di-tert.butyl-4-hydroxybenzyl)-2,4,6-trimethylbenzene-di-(3,5-di-tert.butyl-4-hydroxybenzyl)sulfide 3,5-di-tert.butyl-4-hydroxybenzyl-mercapto-acetic acid isooctyl ester
bis-(4-tert.butyl-3-hydroxy-2,6-dimethylbenzyl)dithiolterephthalate
1,3,5-tris-(3,5-di-tert.butyl-4-hydroxybenzyl)-isocyanurate
1,3,5-tris-(4-tert.butyl-3-hydroxy-2,6-dimethylbenzyl)isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt 1.6. Acylaminophenols, for example,
4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbamate 1.7. Esters of β-(3,5-di-tert-butyl-4-hydroxyphenyl)propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β-(5-tert-butyl-4-hydroxy-3-methylphenyl)propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.9. Amides of β-(3,5-di-tert.butyl-4-hydroxyphenyl)-propionic acid for example,
N,N'-di-(3,5-di-tert.butyl-4-hydroxyphenylpropionyl)hexamethylenediamine
N,N'-di-(3,5-di-tert.butyl-4-hydroxyphenylpropionyl)trimethylenediamine
N,N'-di-(3,5-di-tert.butyl-4-hydroxyphenylpropionyl)hydrazine 2. UV absorbers and light stabilizers 2.1. 2-(2'-Hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 4'-octoxy, 3',5'-di-tert.amyl-, 3',5'-bis-(α,α-dimethylbenzyl)-derivative.

2.2. 2-Hydroxy-benzophenones, for example, the 4-hydroxy-, 4-methoxy-, 4-octoxy-, 4-decyloxy-, 4-dodecyloxy-, 4l-benzyloxy, 4,2',4'-trihydroxy- and 2'-hydroxy-4,4'-dimethoxy derivative.

2.3. Esters of optionally substituted benzoic acids for example, phenyl salicylate, 4-tert.butyl-phenylsalicylate, octylphenyl salicylate, dibenzoylresorcinol, bis-(4-tert.butylbenzoyl)-resorcinol, benzoylresorcinol, 3,5-di-tert.butyl-4-hydroxybenzoic acid 2,4-di-tert.butyl-phenyl ester and 3,5-di-tert.-butyl-4-hydroxybenzoic acid hexadecyl ester.

2.4. Acrylates, for example, α-cyano-β,β-diphenylacrylic acid ethyl ester or isooctyl ester, α-carbomethoxycinnamic acid methyl ester, α-cyano-β-methyl-p-methoxy-cinnamic acid methyl ester or butyl ester, α-carbomethoxy-p-methoxycinnamic acid methyl ester, N-(β-carbomethoxy-β-cyanovinyl)-2-methylindoline.

2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methylphenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethylpiperazinone).

2.7. Oxalic acid diamides, for example, 4,4'-di-octyloxyoxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis (3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.butylphenyl)pentaerythritol diphosphite, tristearylsorbitol triphosphite, tetrakis-(2,4-di-tert.butylphenyl)-4,4'-diphenylylenediphosphonite.

5. Compounds which destroy peroxide, for example, esters of β-thiodipropionic acid, for example the lauryl, stearyl, myristyl or tridecyl esters. Mercaptobenzimidazole or the zinc salt of 2-mercaptobenzimidazole, zinc-dibutyl-dithiocarbamate, dioctadecyldisulfide, pentaerythritol-tetrakis(β-dodecylmercapto)-propionate.

6. Polyamide stabilizers, for example copper salts in combination with iodides and/or phosphorus compounds and salts of divalent manganese.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibers, asbestos, talc, kaolin, mica, barium sulfate, metal oxides and hydroxides, carbon black, graphite.

10. Other additives, for example, plasticizers, lubricants, emulsifiers, pigments, optical brighteners, flameproofing agents, anti-static agents, blowing agents and thiosynergists such as dilaurylthiodipropionate or distearylthiodipropionate.

While the instant esters can be beneficially used as stablizers for a variety of substrates, particularly the polyolefins, both alone and in conjunction with other coadditives, the introduction of the instant esters into polyolefins, optionally containing various alkali metal, alkaline earth metal and aluminum salts of higher fatty acids (see Additive #7 hereinabove), with hindered phenolic antioxidants results in enhanced and particularly salubrious protection to such substrates in terms of reducing color formation stemming from the presence of the phenols. Such phenolic antioxidants include n-octadecyl 3,5-di-tert-butyl-4-hydroxyhydrocinnamate, neopentanetetrayl tetrakis-(3,5-di-tert-butyl-4-hydroxyl-hydrocinnamate), di-n-octadecyl 3,5-di-tert- butyl-4-hydroxybenzyl-phosphonate, 1,3,5-tris(3,5-di-tert-butyl-4-hydroxy-benzyl)isocyanurate, thiodiethylene bis(3,5-di-tert-butyl-4-hydroxyhydrocinnamate), 1,3,5-trimethyl-2,4,6-tris (3,5-di-tert-butyl-4-hydroxybenzyl)-benzene, 3,6-di-oxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-di-methyl-4-tert-butyl-3-hydroxybenzyl)isocyanurate, 1,1,3-tris-(2-methyl-4-hydroxy-5-tert-butylphenyl)butane, 1,3,5-tris-[2-(3,5-di-tert-butyl-4-hydroxyhydrocinnamoyloxy)-ethyl]-isocyanurate, 3,5-di-(3,5-di-tert-butyl-4-hydroxybenzyl)-mesitol, hexamethylene bis(3,5-di-tert-butyl-4-hydroxyhydrocinnamate), 1-(3,5-ditert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl-3,5-di-tert-butyl-4-hydroxybenzylphosphonate), ethylene bis[3,3-di(3-tert- butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)-hydrazide, and N,N'-bis[2-(3,5-tert-butyl-4-hydroxyhydroxo-cinnamoyloxy)ethyl]-oxamide, and preferably neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris-(3,5-di-tert-butyl-4-hydroxybenzyl)isocyanurate, 2,6-di-tert-butyl-p-cresol or 2,2'-ethylidene-bis(4,6-di-tert-butylphenol).

Likewise, the instant compounds prevent color formation when hindered amine light stabilizers are present, such hindered amines including bis(1,2,2,6,6-pentamethyl-4-piperidyl)-2-n-butyl-2-(3,5-di-tert-butyl-4-hydroxybenzyl) malonate; bis(2,2,6,6-tetramethyl-4-piperidyl) sebacate; dimethylsuccinate polymer with 4-hydroxy-2,2,6,6-tetramethyl-1-piperidinethanol; and polymer of 2,4-dichloro-6-octylamino-s-triazine with N'-(2,2,6,6-tetramethyl-4-piperidyl)hexamethylene diamine.

The following examples illustrate the embodiments of this invention. In these examples, all parts given are by weight unless otherwise noted.

EXAMPLE I

O-(3,5-Di-tert-butyl-4-hydroxybenzoyl)-N,N-dibenzylhydroxylamine

To a solution of 27.9 g of dibenzylhydroxylamine and 10.3 g of pyridine in 100 ml of methylene chloride is added a solution of 39.0 g of 3,5-di-tert-butyl-4-hydroxybenzoyl chloride in 100 ml of methylene chloride. After stirring the mixture at room temperature for 24 hours, the reaction mixture is washed with 10% aqueous hydrochloric acid, water, brine and dried. Evaporation followed by crystallization of the residue from heptane affords the title compound as a white solid: mp 90°–92° C.

Anal. Calcd. for $C_{29}H_{35}NO_3$: C, 78.2; H, 7.9; N, 3.1. Found: C, 78.8; H, 8.0; N, 3.2.

EXAMPLE II

O-Di(3,5-di-tert.butyl-4-hydroxyphenyl)acetyl-N,N-dibenzylhydroxylamine

Preparation of Acid Chloride

To a solution of 3.17 g (25 mmol) of oxalyl chloride in 100 ml of dichloromethane is added portionwise 11.72 g (25 mmol) of 2,2-bis(3,5-di-tert-butyl-4-hydroxyphenyl) acetic acid. The formation of acid chloride is determined to be complete when the IR spectrum of the reaction mixture shows the disappearance of the carboxyl absorption at 1710 $cm^{-1}$ corresponding to the free acid. The acid chloride is isolated as a white solid: mp 148°–151° C.

Anal. Calcd. for $C_{30}H_{43}ClO_3$: C, 74.0; H, 8.9. Found: C, 73.8; H, 9.0.

Preparation of the Ester

To a solution of 5.33 g (25 mmol) of N,N-dibenzylhydroxylamine and 2.53 g (25 mmol) of triethylamine in 100 ml of dichloromethane cooled with an ice-water bath is added dropwise the above dichloromethane solution of acid chloride. The reaction mixture is stirred at room temperature until the formation of ester is complete. The reaction mixture is extracted three times with a saturated solution of sodium chloride and the organic phase is dried over anhydrous sodium sulfate. The solvent is removed in vacuo and the residue is recrystallized from petroleum ether to give 12.50 g (75%) of a white solid: mp 141.5°–142.5° C.

Anal. Calcd. for $C_{44}H_{57}NO_4$: C, 79.6; H, 8.7; N, 2.1. Found: C, 79.6; H, 8.7; N, 2.0.

O-(3,5-Di-tert-butyl-4-hydroxyhydrocinnamoyl)-N,N-dibenzylhydroxylamine

The procedure of Example II is followed using 3.17 g (25 mmol) of oxalyl chloride, 6.96 g (25 mmol) of 3-(3,5-di-tert-butyl-4-hydroxyphenyl)propanoic acid, 5.33 g (25 mmol) of N,N-dibenzylhydroxylamine, and 2.53 g (25 mmol) of triethylamine. The residue is recrystallized from petroleum ether to give 9.06 g (77%) of a white solid: mp 93°–95.5° C.

EXAMPLE IV

O-(3,5-Di-tert.butyl-4-hydroxybenzylthio)propionyl-N,N-dibenzylhydroxylamine The compound is prepared using the method of Example II, with 16.20 g of 3-(3,5-di-tert-butyl-4-hydroxybenzylthio)propanoic acid, 10.66 g of N,N-dibenzylhydroxylamine, 5.06 g of triethylamine, and 6.35 g of oxalyl chloride. The residue is purified by preparative HPLC to give 3.0 g of a white solid: mp 84°–86° C.

Anal. Calcd. for $C_{32}H_{41}NO_3S$: C, 74.0; H, 8.0; N, 2.7. Found: C, 73.8; H, 8.0; N, 2.6.

EXAMPLE V

O-(3,5-Di-tert.butyl-4-hydroxybenzyl)-N,N-diethylhydroxylamine

Following the procedure of Example II, the compound is prepared from 3.17 g of oxalyl chloride, 6.25 g of 3,5-di-tert-butyl-4-hydroxybenzoic acid, 2.53 g of N,N-diethylhydroxylamine, and 2.53 g of triethylamine. The residue is recrystallized from petroleum ether to give 3.47 g of a white solid: mp 129°–137° C.

Anal. Calcd. for $C_{19}H_{31}NO_3$: C, 71.0; H, 9.7; N, 4.4. Found: C, 71.0; H, 10.0; N, 4.4.

EXAMPLE VI

3,5-Di-tert-butyl-4-hydroxybenzoic acid, O-ester of $HON[(CH_2)_m CH_3]_2$ where m=15–17

Following the procedure of Example II, the compound is prepared from 12.50 g of 3,5-di-tert-butyl-4-hydroxybenzoic acid, 6.35 g of oxalyl chloride, 5.06 g of triethylamine, and 26.90 g of $HON[(CH_2)_m CH_3]_2$ where m=15–17. The IR spectrum of the product has an absorption at 1730 cm$^{-1}$ which is assigned to the carbonyl group of the ester.

Anal. Calcd. for $C_{49}H_{91}NO_3$: C, 79.3; H, 12.9; N, 1.9. Found: C, 79.2; H, 12.7; N, 1.8.

Light Stabilization of Polypropylene

Unstabilized polypropylene powder (Himont Profax 6501) is thoroughly blended with the indicated amount of additive. The blended materials are then milled on a two-roll mill at 182° C. for 5 minutes, after which time the stabilized polypropylene is sheeted from the mill and allowed to cool. The milled polypropylene is then cut into pieces and compression molded on a hydraulic press at 250° C. and 175 psi (1.2×10$^6$ Pa) into 25 mil (0.625 mm) plaques. The sample is exposed in a fluorescent sunlight/black light chamber until failure. Failure is taken as the hours required to reach 0.5 carbonyl absorbance by infrared spectroscopy on the exposed films.

| Additive | Additive Conc. (% by weight) | Hours to Failure |
|---|---|---|
| None | | 100 |
| Example I | 0.2 | 350 |
| Example III | 0.2 | 260 |

These data thus indicate the effective stabilization activity of the instant compounds.

What is claimed is:

1. A compound of the formula

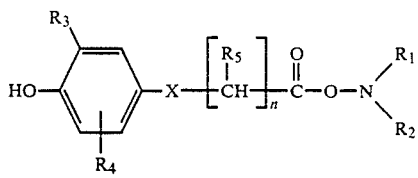

wherein
n is 0–2;
X is —S— or —CH$_2$S—;
R$_1$ and R$_2$ independently are hydrogen, alkyl of 1 to 36 carbon atoms, cycloalkyl of 5 to 12 carbon atoms, allyl, aryl, aralkyl of 7 to 9 carbon atoms, said aralkyl substituted by alkyl of 1 to 36 carbon atoms, or R$_1$ and R$_2$ together with the nitrogen atom can form a 5–7 membered heterocyclic ring;
R$_3$ and R$_4$ independently are alkyl of 1 to 18 carbon atoms, cycloalkyl of 5 to 6 carbon atoms, phenyl, alkaryl of 7 to 18 carbon atoms or aralkyl of 7 to 9 carbon atoms; and
R$_5$ is hydrogen or the group

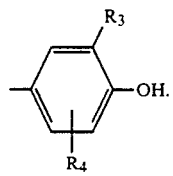

2. A compound of claim 1, wherein R$_1$ and R$_2$ are independently hydrogen, straight-chain or branched alkyl with 1 to 18 carbon atoms, cyclopentyl, cyclohexyl, benzyl, alpha-methylbenzyl or alpha,alpha-dimethylbenzyl.
3. A compound of claim 2, wherein R$_1$ and R$_2$ are benzyl.
4. A compound of claim 1, wherein R$_4$ is positioned ortho to the hydroxyl group.
5. A compound of claim 4, wherein R$_3$ and R$_4$ are tert-alkyl of 4 to 8 carbon atoms.
6. A compound of claim 5, wherein R$_3$ and R$_4$ are tert-butyl.
7. A compound of claim 1, wherein X is a —CH$_2$S—.
8. O-(3,5-Di-tert-butyl-4-hydroxybenzylthio)propionyl-N,N-dibenzylhydroxylamine according to claim 1.
9. A mixture of compounds of the formula

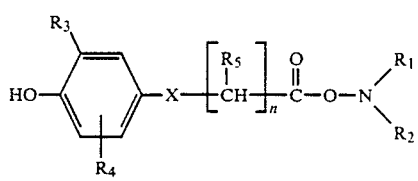

wherein
n is 0–2;
X is —S— or —CH$_2$S—;
R$_1$ and R$_2$ are the alkyl mixture in hydrogenated tallow amine;
R$_3$ and R$_4$ independently are alkyl of 1 to 18 carbon atoms, cycloalkyl of 5 to 6 carbon atoms, phenyl, alkaryl of 7 to 18 carbon atoms or aralkyl of 7 to 9 carbon atoms; and
R$_5$ is hydrogen or the group

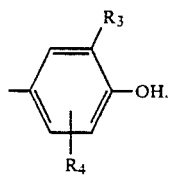

* * * * *